(12) United States Patent
Kovach et al.

(10) Patent No.: US 10,384,794 B2
(45) Date of Patent: Aug. 20, 2019

(54) EDGE SEALS FOR COMPOSITE STRUCTURE FUEL TANKS

(71) Applicant: The Boeing Company, Chicago, IL (US)

(72) Inventors: Daniel J. Kovach, Kent, WA (US); Kari L. Stromsland, Seattle, WA (US); Diane L. Heidlebaugh, Kenmore, WA (US); John A. Ward, Sumner, WA (US); Arlene M. Brown, Normandy Park, WA (US); Donald K. Dabelstein, Renton, WA (US)

(73) Assignee: The Boeing Company, Chicago, IL (US)

( * ) Notice: Subject to any disclaimer, the term of this patent is extended or adjusted under 35 U.S.C. 154(b) by 746 days.

(21) Appl. No.: 14/504,862

(22) Filed: Oct. 2, 2014

(65) Prior Publication Data

US 2015/0014308 A1   Jan. 15, 2015

Related U.S. Application Data

(62) Division of application No. 11/581,120, filed on Oct. 13, 2006, now Pat. No. 8,900,496.

(51) Int. Cl.
*B64D 37/32* (2006.01)
*B64D 37/06* (2006.01)
(Continued)

(52) U.S. Cl.
CPC .............. *B64D 37/32* (2013.01); *B32B 27/00* (2013.01); *B64D 37/06* (2013.01);
(Continued)

(58) Field of Classification Search
CPC ........ B64D 37/32; B64D 37/02; B64D 37/06; Y10T 156/1034; Y10T 156/1052;
(Continued)

(56) References Cited

U.S. PATENT DOCUMENTS

| 2,465,512 | A | * | 3/1949 | Carasse | C08K 5/39 524/202 |
| 4,336,291 | A | | 6/1982 | Broadhurst et al. | |

(Continued)

FOREIGN PATENT DOCUMENTS

| GB | 2201737 | * | 9/1988 |
| JP | H08-091059 | * | 4/1996 |

OTHER PUBLICATIONS

Pridham et al., "Integral Lightning Strike Protection of CFC Fuel Tanks on Aircraft," SAE Technical Paper Series, International Conference on Lightning and Static Electricity, The Engineering Society for Advancing Mobility Land Sea Air and Space International, Sep. 10-14, 2001, 7 pages.
(Continued)

*Primary Examiner* — Camie S Thompson
(74) *Attorney, Agent, or Firm* — Hanley, Flight and Zimmerman, LLC

(57) ABSTRACT

Edge seals for composite structure fuel tanks are disclosed herein. One disclosed apparatus includes a seal covering an exposed edge of a carbon fiber reinforced composite fuel tank, where the seal comprises a layer of dielectric material to insulate carbon fibers at the exposed edge from fuel in the tank.

18 Claims, 2 Drawing Sheets

(51) Int. Cl.
*B32B 27/00* (2006.01)
*B29C 63/00* (2006.01)
*B29C 63/04* (2006.01)

(52) U.S. Cl.
CPC .......... *B29C 63/0034* (2013.01); *B29C 63/04* (2013.01); *Y10T 156/1034* (2015.01)

(58) Field of Classification Search
CPC ..... Y10T 428/31504; Y10T 428/24777; B29C 63/004; B29C 63/04; B29C 63/0034; B29C 66/71; B29C 66/7212; B29C 66/721; B29C 66/73752; B29C 67/0044; B32B 3/26; B32B 27/00; B32B 2250/20; B32B 2250/44; B32B 2260/023; B32B 2260/046; B32B 2260/106; B32B 2305/076; B32B 2605/202; B29K 2063/00; B29K 2053/00; F17C 1/00; F17C 1/02
USPC ................. 220/4.14, 495.06, 4.21, 586, 421; 428/411.1, 192; 156/250, 60, 216; 244/135 R; 206/524.3; 264/138
See application file for complete search history.

(56) References Cited

U.S. PATENT DOCUMENTS

| | | | |
|---|---|---|---|
| 4,382,049 A | 5/1983 | Hofmeister et al. | |
| 4,448,838 A | 5/1984 | McClenahan et al. | |
| 4,502,092 A | 2/1985 | Bannink, Jr. et al. | |
| 4,556,591 A | 12/1985 | Bannink, Jr. | |
| 4,755,570 A * | 7/1988 | Hefner, Jr. | C08F 283/10 525/529 |
| 4,824,713 A | 4/1989 | Brick | |
| 4,905,931 A | 3/1990 | Covey | |
| 4,916,401 A | 4/1990 | Bogard et al. | |
| 4,920,449 A | 4/1990 | Covey | |
| 5,461,534 A | 10/1995 | Gondot et al. | |
| 5,752,909 A | 5/1998 | Sagvik et al. | |
| 7,090,167 B2 | 8/2006 | Friddell et al. | |
| 7,438,974 B2 | 10/2008 | Obuhowich | |
| 2004/0166333 A1 * | 8/2004 | Byrd | C08G 18/61 428/447 |
| 2005/0144874 A1 | 7/2005 | West et al. | |
| 2008/0128430 A1 | 6/2008 | Kovach et al. | |

OTHER PUBLICATIONS

Heidlebaugh et al., "Photographic Spark Detection Film Sensitivity Study," SAE Technical Paper Series, International Conference on Lightning and Static Electricity, The Engineering Society for Advancing Mobility Land Sea Air and Space International, Sep. 10-14, 2001, 10 pages.

The Lightning Task Group of EEHWG, "Protection of Aircraft Fuel Systems Against Fuel Vapor Ignition Due to Lightning," The Lightning Task Group of EEHWG, Jul. 22, 1995, 7 pages.

Dave Walen, "Electrical Bonding and Transient Suppression," Power Point Presentation, FAA Fuel System Safety, Aug. 27, 2002, 31 pages.

United States Patent and Trademark Office, "Office Action," issued in connection with U.S. Appl. No. 11/581,120, dated Jan. 2, 2014, 19 pages.

United States Patent and Trademark Office, "Final Office Action," issued in connection with U.S. Appl. No. 11/581,120, dated Sep. 23, 2011, 25 pages.

United States Patent and Trademark Office, "Office Action," issued in connection with U.S. Appl. No. 11/581,120, dated Mar. 21, 2011, 14 pages.

United States Patent and Trademark Office, "Final Office Action," issued in connection with U.S. Appl. No. 11/581,120, dated Dec. 7, 2010, 10 pages.

United States Patent and Trademark Office, "Office Action," issued in connection with U.S. Appl. No. 11/581,120, dated Jun. 30, 2010, 16 pages.

United States Patent and Trademark Office, "Advisory Action," issued in connection with U.S. Appl. No. 11/581,120, dated Feb. 24, 2011, 3 pages.

United States Patent and Trademark Office, "Restriction," issued in connection with U.S. Appl. No. 11/581,120, dated Mar. 31, 2010, 10 pages.

United States Patent and Trademark Office, "Notice of Allowance," issued in connection with U.S. Appl. No. 11/581,120, dated Jul. 16, 2014, 23 pages.

* cited by examiner

EDGE SEALS FOR COMPOSITE STRUCTURE FUEL TANKS

RELATED APPLICATION

This patent is a divisional of U.S. patent application Ser. No. 11/581,120, which was filed on Oct. 13, 2006, which was granted on Dec. 2, 2014, as U.S. Pat. No. 8,900,496. The foregoing U.S. Patent Application is hereby incorporated herein by reference in its entirety.

FIELD OF THE DISCLOSURE

The patent broadly relates to composite structure fuel tanks, especially for aircraft, and deals more particularly with a laminate edge construction that reduces the possibility of fuel combustion due to an electric charge.

BACKGROUND

Federal regulations are imposing increasingly stringent standards for fuel tanks used on commercial aircraft. These regulations are directed toward reducing the possibility that fuel or fuel vapors in or around the tank might be ignited by ignition sources such as an electrical charge or spark produced by direct lightning strikes or other electrical currents reaching the fuel due to catastrophic structural failures.

Various solutions have been proposed for mitigating the risk of fuel tank ignition, but each has limitations and none has been entirely successful. For example, bladders have been employed to isolate fuel within tanks from the effects of an ignition event caused by failure of the fuel tank structure, however this solution requires relatively complicated tank geometry and is inefficient when applied to commercial transport aircraft. Another solution involves the use of a completely metallic internal structure for the fuel tank, but this approach is both inefficient from a strength and stiffness-to-weight standpoint, and is expensive relative to other potential solutions.

Composite structure fuel tanks are commonly used in commercial transport aircraft but these tanks also require protection against potential ignition of fuel. Composite structure fuel tanks are typically manufactured from structural members comprising carbon fiber reinforced polymer laminates. The laminate members must be trimmed to size, typically using a diamond saw or water jet cutter. Prior to trimming, the carbon fibers are sealed by the epoxy resin within the laminate, but cutting of the laminate during the edge trimming process results in the carbon fibers being exposed at the cut edges.

Some of these cut edges on the laminated structural members may be exposed to the interior of the fuel tank or to fuel lines where small amounts of fuel or fuel vapor may be present. When subjected to a high energy electrical charge such as that resulting from a lightning strike, and result in sparking between the fibers, or the release of highly energized particles which have the potential to ignite fuel. However, in order to partially mitigate this risk, polysulfide-based sealants have been applied to the cut laminate edges. The application of such sealants requires experienced personnel and is labor intensive in terms of both the sealant application and subsequent in-service inspection. Moreover, these sealants must be applied after the fabrication of the fuel tank structure is completed since the sealant layers are relatively fragile and thus subject to damage caused by handling or assembly of tank substructures. Another drawback of polysulfide-based sealants is that failures in the sealant coating are difficult, or sometimes impossible to inspect. This detection problem is due in part, to the fact that polysulfide-based sealants are opaque, and thus visually mask underlying bonding defects or defects in the composite structure. As a result, failure of polysulfide-based sealants can result in latent defects during in-service maintenance and inspections.

Another potential solution to the problem of reducing the risk of fuel tank ignition involves designing composite fuel tanks without the use of internal cut laminate edges, however this approach generally results in highly inefficient fuel tank designs from a fuel capacity to weight standpoint.

Accordingly, there is a need for a composite structure fuel tank in which cut edges of the laminate are permanently sealed, and both mechanically isolated and electrically insulated from fuel within the tank. The examples disclosed are directed towards satisfying this need.

SUMMARY

An example apparatus includes a seal covering an exposed edge of a carbon fiber reinforced composite fuel tank, where the seal comprises a layer of dielectric material to insulate carbon fibers at the exposed edge from fuel in the tank.

Another example apparatus includes a seal wrapping around a cut edge of a fiber reinforced composite laminate fuel tank for an aircraft, where the seal comprises a reinforced thermosetting resin layer covering the cut and forming a dielectric layer insulating reinforcing fibers to insulate fuel in the tank from electrical discharge, and where the seal covers a first portion of a first side of the carbon fiber reinforced tank and a second portion of a second side of the carbon reinforced tank.

Yet another example apparatus includes carbon fiber polymer laminate members of an aircraft fuel tank, where the laminate members are cut to define cut laminate edges, and dielectric material wrapping the cut laminate edges between the laminate members to cover a portion of an interior side of the laminate members and an exterior side of the laminate members to define a mechanical barrier between the fuel tank and the cut laminate edges.

DETAILED DESCRIPTION

Figure 1:
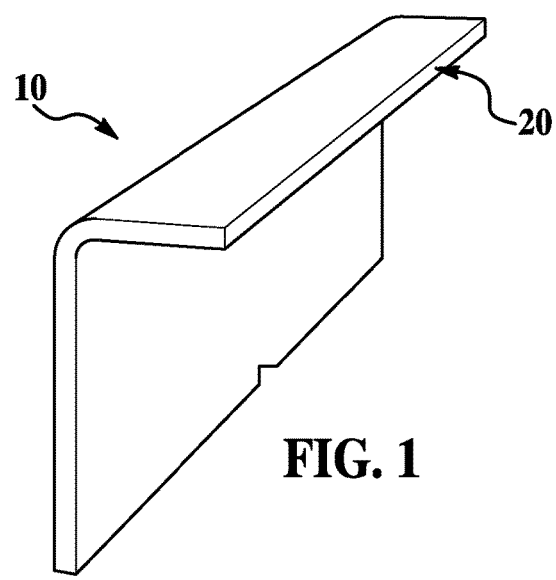
FIG. 1 is a perspective view of a carbon fiber reinforced laminated spar, trimmed to size and having a cut edge.
Figure 2:
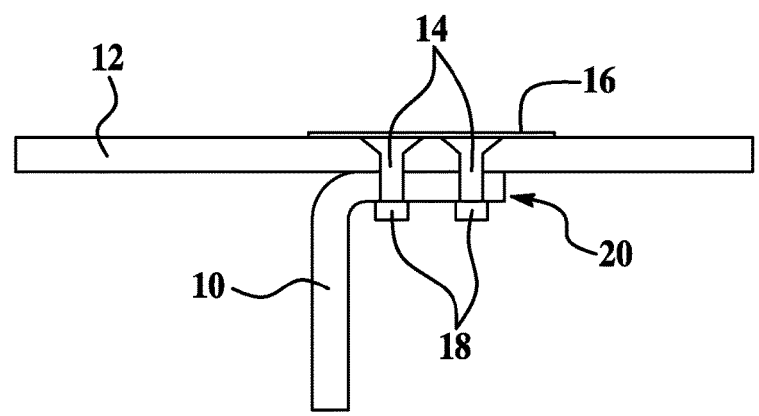
FIG. 2 is an end view of the spar shown in FIG. 1, connected to a skin.

Referring first to FIGS. 1 and 2, a variety of carbon fiber reinforced polymer composite (CFRP) structural members are commonly employed in aircraft construction, such as a structural spar member 10 which is used to support numerous types of structures. For example, CFRP structural members like the spar 10 are used to fabricate and mount fuel tanks in an aircraft. In the illustrated example, the spar 10 is secured to and supports a skin 12, using fasteners 14, which pass through a copper plate 16 forming part of an electrical current diversion system, and are held in place by fastening collars 18. It should noted here that although an L-shaped spar has been selected to illustrate the principals of the examples disclosed herein, a wide variety of other forms of structural members are suitable for use with the examples disclosed herein, including C-shaped spars which are more commonly used in constructing commercial aircraft.

The spar 10 is manufactured using conventional layup techniques, which include laying multiple plies of unidirectional knitted or woven reinforcing fiber in tape or mat form, over a tool, impregnating the fiber reinforcement with a thermosetting resin, such as epoxy resin, and then compacting and curing the layup. The layup can also be formed using prepreg. During the compaction process, a certain amount of the epoxy resin is forced out through the edges of the spar 10, effectively covering the reinforcing fibers at the spar edges. Following curing, the spar 10 is trimmed to the required final dimensions, using a water jet cutter or other form of cutting equipment. This trimming process leaves a "cut" edge in which the individual reinforcing fibers at the edge are no longer covered and sealed by the resin, but rather are exposed to the surrounding environment. One such cut edge is indicated by the numeral 20, which runs the entire length of the spar 10.

Figure 3:
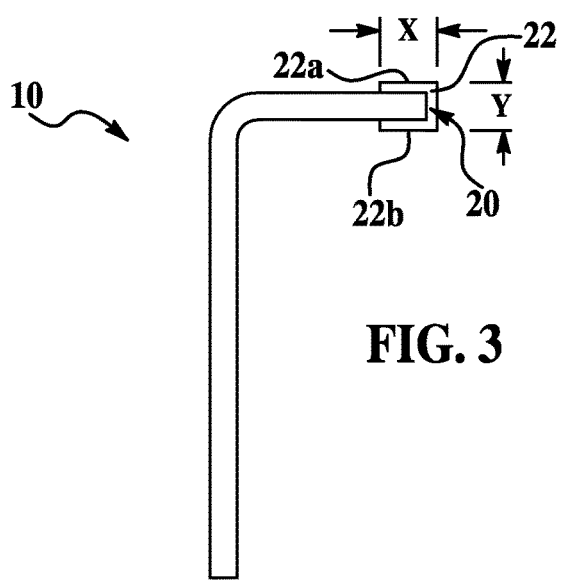
FIG. 3 is an end view of the spar shown in FIG. 1, but showing a cut edge covered by an edge seal forming an example.
Figure 4:
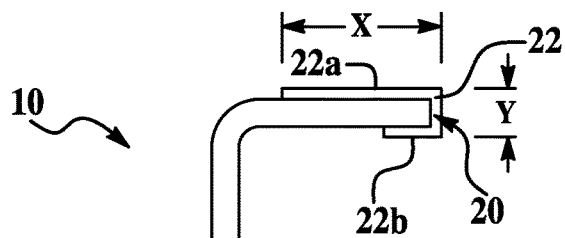
FIG. 4 is a view similar to FIG. 3, but showing another example of the edge seal.

Referring now also to FIGS. 3 and 4, the present example comprises an edge seal 22 which functions to protectively cover the cut edge 20, and mitigate the risk that exposed carbon fibers may contribute to a sparking event that could ignite fuel. The edge seal 22 comprises a layer of thermosetting resin, preferably reinforced by one or more layers of reinforcing materials. The reinforcement may comprise unidirectional woven or knitted carbon fibers or fiberglass fibers, for example. In one example, the edge seal 22 may comprise a single layer of carbon fiber reinforcement, impregnated with epoxy resin. Other possible examples and variations will be discussed below.

While the thermosetting resin used in the edge seal 22 preferably comprises epoxy, other thermosetting resins such as polyester may be used. Importantly, the material characteristics of the particular thermosetting material used in the edge seal 22 should be selected to match those of the thermosetting resin used in forming the structural member to which the seal is applied, which in the illustrated example, is a CFRP composite spar 10.

The edge seal 22 forms an insulating dielectric layer between the cut edge 20 and areas in or around the fuel tank where fuel or fuel vapors may be present. In addition, the edge seal 22 forms a mechanical barrier that prevents energetic, hot particulates from being ejected from the edge 20. As used herein, the term electric charge is intended to include electrical potentials generated from any of various sources, including lightning strikes, buildup of static charges or other charge sources created by catastrophic structural failures. Such charges can result in voltage and/or thermal sparking at the cut edge 20, and particularly between the exposed carbon fibers at the edge 20. Voltage sparking is the result of dielectric breakdown including tracking or flashover across dielectric surfaces. Thermal sparking consists of burning fragments of melted material thrown outwardly away from hot spots such as the carbon fibers.

The exact construction and choice of materials used in the edge seal 22 will depend on the application, and particularly the types, levels and duration of electrical charges that are to be protected against. For example, lower energy charge events that result in low level electrical sparking, also know as edge glow, at the edge 20 may be contained using an edge wrap 22 that is either relatively thin or contains a reinforcement layer that is either thin or light weight. Higher energy electrical spark events that eject hot particulates from the edge 20 may require the use of a thicker edge seal 22, or one that employs a reinforcement that is sufficiently strong to physically contain the hot particulates. Since the various reinforcements that may be used successfully have different weights, the spark mitigating properties provided by each potential type of reinforcement may need to be balanced against the weight penalties represented by heavier reinforcements.

The edge seal 22 may comprise a prepreg form which includes the previously mentioned sheet or tape of reinforced fibers that have been impregnated with thermosetting resin. The prepreg form is preferably in a semi-cured or B-stage when it is applied to the edge 22. As used herein, "B-stage" refers to an intermediate stage in the reaction of a thermosetting resin, in which the material swells when in contact with certain liquids and softens when heated, but may not entirely dissolve or fuse. These B-stage materials are often in the form of sheet material impregnated with a resin cured to an intermediate stage, also known as prepreg. A prepreg is a ready to mold material in sheet form which may be cloth, mat or other reinforcement impregnated with resin cured to a B-stage. The prepreg is used to lay-up the part into the finished shape, following which the lay-up is cured with heat and pressure.

The prepreg form may be applied to the edge 20 of the spar 10 either before or after spar 10 is cured. As previously mentioned, it is important that the material characteristics of the prepreg form are selected to match those of the spar 10. For example, the coefficient of thermal expansion (CTE) of the CFRP laminate forming the spar 10 and the prepreg form used for the edge seal 22 should be closely matched. By using a thermosetting resin for both the spar 10 and the edge seal 22, a particularly good bond is achieved between the edge seal 22 and the cut edge 20.

Figure 5:
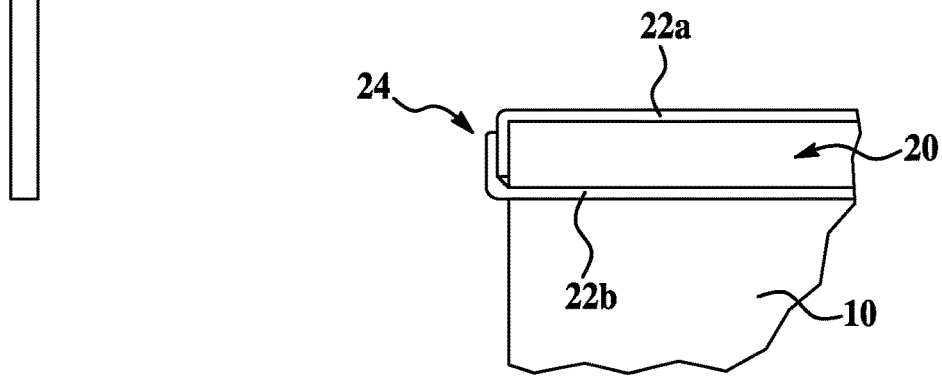
FIG. 5 is a fragmentary, cross sectional view of an end of the cut edge but showing the edge wrap covering the end of the spar.

As can be seen in FIGS. 3 and 4, the edge seal 22 is wrapped around edge 20 so as to overlap the opposite faces of the end of the spar 10. Specifically, the edge seal 22 includes overlapping portions 22a, 22b which assure that the edge seal 22 is tightly bonded to the spar 10, and that any sparks generated in the cut edge 20 are well isolated from the surrounding area. The amount of overlap will depend on the particular application, the materials and the dimensions of the parts. Generally, the width "X" of the overlap should be approximately equal to or greater than the depth "Y" of the cut edge 20. In some cases, such as that shown in FIG. 4, one of the overlapping portions 22a may be greater than the other overlapping portion 22b. As shown in FIG. 5, depending on the application, the edge seal 22 may be wrapped over the ends 24 of the spar 10, adjacent the cut edge 20, thereby further isolating the cut edge 20 from the surrounding environment.

While a single layer of epoxy impregnated carbon fiber reinforcement has been found to be particularly effective in mitigating higher energy sparking events at the cut edge 20, other material combinations may be used that are compatible with the material system employed to fabricate the structural member on which the edge seal is installed. For example, 3 plies of thermosetting resin impregnated fiberglass totaling 12.3 mils in thick was found to provide an effective edge wrap for a 0.32 inch thick CFRP cut edge. The use of 2 plies of thermosetting resin impregnated fiberglass combined with one layer of surfacing film totaling 13.2 mils thick was also found to provide effective mitigation results for a 0.32 inch thick CFRP cut edge. Either of the fiberglass or CFRP layer can be combined with an epoxy adhesive layer or a layer of surfacing film if desired. Optimum spark mitigation at the higher energy levels may be achieved using a single layer of CFRP in combination with a layer of epoxy adhesive. Finally, using the above example of a 0.32 inch thick cut CFRP edge, lower energy level sparking events can be mitigated using a single 4.1 mil thick layer of resin impregnated fiberglass, or a single 5 mil thick layer of surfacing film, or a single 5 mil thick layer of epoxy adhesive. In general, nonconductive reinforcing fibers are preferred, however, conductive fibers may also be used. Furthermore, reinforcing fibers that result in a translucent reinforcement layer are desirable; such fibers include glass, quartz and polyethylene.

Figure 6:
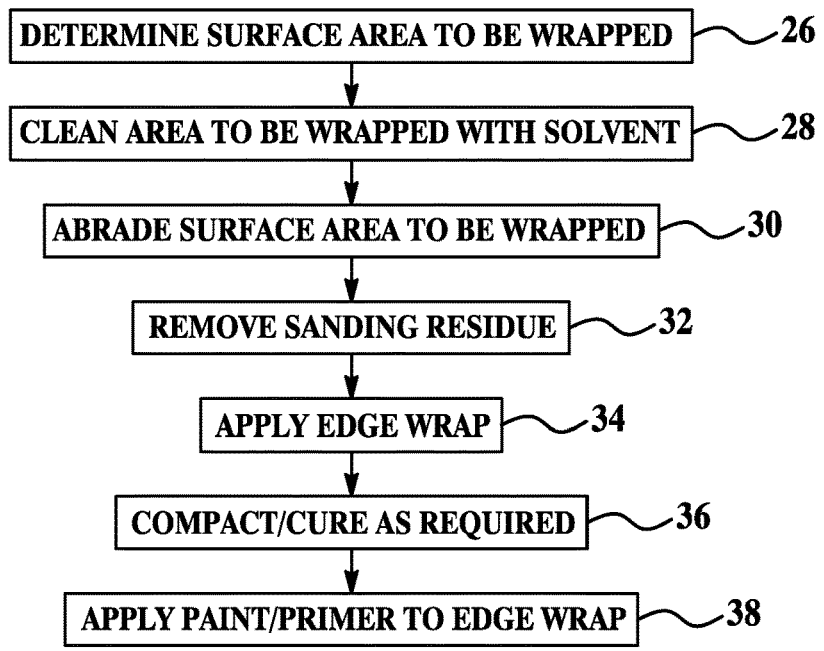
FIG. 6 is a simplified flow chart showing the basic steps in applying the edge seal of the examples disclosed herein.

Reference is now made to FIG. 6 which shows the basic steps used in applying the edge seal 22 of the present example to the cut edge 20. First, at step 26, a determination is made as to what surface areas on and around the cut edge 20 are to be covered by the edge wrap 22, based on the various considerations previously discussed. Then at step 28, the surface area to be wrapped is cleaned using an appropriate solvent. Next, at step 30, the surface area to be covered is abraded, using sandpaper for example, to assure that an effective bond is achieved with the edge seal 22. At step 32, the sanding residue is removed from the bonding surface. The edge wrap 22 is then applied to the cut edge 20, as previously described. At step 34, an adhesive may first be applied to the cut edge 20 and those areas of the opposite faces of the spar 10 where the edge seal 22 is to overlap. One suitable adhesive is a structural adhesive film available from the 3M Company and identified by the manufacturer's designation of "Scotch-Weld" AF555 which comprises an epoxy film adhesive particularly suited for use with composite materials.

Next, a preform of the materials that form the edge wrap 22 is cut and applied to both cut edge 20 and wrapped around the adjacent surfaces, depending on the exact configuration and dimensions of the edge seal 22. The edge seal 22 is then compacted at step 36 using an autoclave or vacuum bagging, and cured at elevated temperature for an appropriate period of time. Following curing, the part (spar 10), including the edge seal 22, is primed and painted at step 38. The primer may comprise a corrosion resistant, epoxy primer commonly used to coat fuel tanks.

In addition to the mechanical and electrical properties of the edge seal 14 described above, the thermosetting resin dielectric composite materials used in the edge seal 22 allow visual inspection for damage to the underlying composite structure resulting from mechanical abuse or past electrical transmit stresses, such as those from lightning strikes. This is due to the fact that the thermosetting resins and reinforcement layers used in the edge seal 22 are translucent to some degree and visually reveal damage to the surface of the spar 10 or to the edge seal-spar bond that can result from sparking or physical impacts. For example, in the event of a lightning strike that debonds a portion of the edge seal 22 from the underlying laminate forming the spar 10, an inspector can visually detect this condition. Since both the thermosetting resin and reinforcement used in the edge seal 22 are nonconducting, the edge seal 22 provides, in effect, electrical shielding between the fuel and cut edges 20, where transient high voltage potential differences may be present during a lightning strike.

The edge seal 22 functions to contain the pressures and energies at the cut edge 20 even during high electrical charge events such as direct attach lightning strikes. The use of thermosetting resins in combination with reinforcements which form the seal 22 provide a durable and robust edge treatment which can be carried out using conventional composite processing techniques. The edge seal 22 acts as a durable layer that both electrically insulates and mechanically restrains any hot particulates from emanating from the cut edge 20.

Although this patent has been described with respect to certain disclosed examples, it is to be understood that the specific examples are for purposes of illustration and not limitation, as other variations will occur to those of skill in the art.

What is claimed is:

1. An apparatus comprising:
   first and second carbon fiber reinforced laminate members of a carbon fiber reinforced composite fuel tank, the first and second carbon fiber reinforced laminate members having first and second exposed laminate edges, respectively; and
   a seal to cover the first exposed laminate edge, the seal comprising a layer of dielectric material, the seal to wrap around the first exposed laminate edge to cover a portion of an exterior side and a portion of an interior side of the first carbon fiber reinforced laminate member, the exterior side and the interior side on opposite sides of the first carbon fiber reinforced laminate member.

2. The apparatus of claim 1, wherein the fuel tank is an aircraft fuel tank.

3. The apparatus of claim 1, wherein the layer of dielectric material comprises a thermosetting polymer resin.

4. The apparatus of claim 3, wherein the seal includes at least one layer of reinforcement.

5. The apparatus of claim 4, wherein the at least one layer of reinforcement is nonconductive.

6. The apparatus of claim 1, wherein the layer of dielectric material is translucent.

7. The apparatus of claim 1, wherein the seal is a first seal, and further including a second seal to wrap around the second exposed laminate edge to cover a portion of an exterior side and a portion of an interior side of the second carbon fiber reinforced laminate member.

8. The apparatus of claim 1, wherein the seal is to be folded over opposed first and second lateral edges of the first carbon fiber reinforced laminate member.

9. The apparatus of claim 8, wherein the seal is folded from the exterior and interior surfaces to cover the first and second lateral edges.

10. The apparatus of claim 9, wherein the seal being folded from the exterior and interior surfaces defines overlapping seal joints at the first and second lateral edges.

11. An aircraft fuel tank, comprising:
    first and second carbon fiber polymer laminate members, wherein the first and second laminate members are cut to define first and second cut laminate edges, respectively; and
    dielectric material wrapping around the first cut laminate edge and positioned between the first and second laminate members, the dielectric material wrapping folded over the first cut laminate edge to cover a portion of an interior side and a portion of an exterior side of the first laminate member to define a mechanical barrier between the aircraft fuel tank and at least one of the first and second cut laminate edges, the exterior side and the interior side on opposite sides of the first laminate member.

12. The aircraft fuel tank of claim 11, wherein the dielectric material includes a reinforced thermosetting resin layer that is translucent to allow visual inspection of a portion of the aircraft fuel tank.

13. The aircraft fuel tank of claim 11, further comprising a thermosetting polymer resin applied to the first cut laminate edge.

14. The aircraft fuel tank of claim 11, wherein the dielectric material comprises a prepreg form.

15. The aircraft fuel tank of claim 11, wherein a layer of the dielectric material is translucent.

16. The aircraft fuel tank of claim 11, wherein the dielectric material comprises a reinforcement layer.

17. The aircraft fuel tank of claim 16, wherein the reinforcement layer is impregnated with epoxy resin.

18. The aircraft fuel tank of claim 16, wherein the reinforcement layer is non-conductive.

* * * * *